United States Patent
Gurumoorthy et al.

(10) Patent No.: US 6,525,739 B1
(45) Date of Patent: Feb. 25, 2003

(54) METHOD AND APPARATUS TO REUSE PHYSICAL MEMORY OVERLAPPING A GRAPHICS APERTURE RANGE

(75) Inventors: Nagasubramanian Gurumoorthy, Hillsboro, OR (US); Shivaprasad Sadashivaiah, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/451,359

(22) Filed: Dec. 2, 1999

(51) Int. Cl.[7] .............................................. G06F 12/02
(52) U.S. Cl. ...................... 345/566; 345/543; 711/206; 711/202
(58) Field of Search ................................ 345/564–566, 345/568, 543, 520, 501, 541, 542; 711/202, 203, 206–208

(56) References Cited

U.S. PATENT DOCUMENTS 5,933,158 A * 8/1999 Santos et al. ............... 345/501
6,069,638 A * 5/2000 Porterfield ................. 345/541
6,211,891 B1 * 4/2001 Wahlig ....................... 345/503
6,358,204 B1 * 3/2002 Finger et al. ................ 600/437

* cited by examiner

Primary Examiner—Kee M. Tung
(74) Attorney, Agent, or Firm—Marger Johnson & McCollom, P.C.

(57) ABSTRACT

The AGP graphics card queries the system to determine whether the chipset is symmetric or asymmetric. If the chipset is symmetric and other devices can access the graphics address re-mapping table, the graphics aperture is reserved from the system memory. Other devices are denied access to the portion of the system memory reserved for the graphics aperture. The graphics address re-mapping table is then filled to map input addresses in the graphics aperture to identical output addresses. If the chipset is asymmetric and only the Accelerated Graphics Port graphics card can access the graphics address re-mapping table, no system memory is reserved for the graphics aperture, and other devices can access the portion of memory whose addresses are used by the graphics aperture. Then, as the graphics aperture needs additional memory blocks, they are allocated from the system, and input addresses are mapped to the allocated memory blocks within the graphics address re-mapping table.

26 Claims, 8 Drawing Sheets

METHOD AND APPARATUS TO REUSE PHYSICAL MEMORY OVERLAPPING A GRAPHICS APERTURE RANGE

FIELD OF THE INVENTION

This invention relates to the use of memory in a computer and, more particularly, to the use of computer memory for graphics.

BACKGROUND OF THE INVENTION

Chipsets featuring an Accelerated Graphics Port (AGP) provide enhanced graphics performance using a Graphics Address Re-Mapping Table (GART). The GART is a page table supported by the chipset for use by the graphics cards. The GART maps a contiguous block of memory addresses to the actual memory blocks allocated for the Graphics Aperture (GA). In reality the GA is made up of a number of disjoint pages scattered all over system memory. The GART re-maps these disjoint pages to a contiguous graphics aperture. For example, FIG. 1 shows a how a GART 110 could work in a memory map 105. Assume in FIG. 1 that the memory map 105 includes a Random Access Memory (RAM) space four gigabytes (GB) in size but only 2 GB of RAM is actually installed. The memory addresses between 3 GB and 4 GB in memory map 105 are reserved for a GA 112. The GART 110 then maps these addresses to blocks of physical memory. For example, addresses 115A, 120A, 125A, and 130A in GART 110 are mapped to pages 115B, 120B, 125B, and 130B, respectively, in the physical RAM 105. These pages 115B, 120B, 125B, and 130B constitute pages of the GA.

GART implementation varies with chipsets. In one prior art implementation, a device driver called AGP GART driver allows a target operating system to expose the AGP features for graphics applications.

One of the major functions performed by the GART driver is to fill up the GART table with page addresses. Each GART table entry corresponds to a page in the physical memory. Today, most chipsets support not more than 2 GB of RAM. This will change in future chipsets.

Usually the Basic Input Output System (BIOS) or the GART driver sets the base address for the GA. The GA range (GA base address plus the length of the GA) is then marked as reserved. Currently, the GA is mapped to a memory range where no RAM is present (say in the range 3 GB–4 GB). For instance, a system that has 2 GB of RAM can map its GA anywhere in the range 2 GB to 4 GB. Thus the GA range does not overlap with the memory range where RAM is present. The GART driver then allocates a page of memory for each GART entry and fills the needed fields appropriately. This works well now because currently no physical memory exists in the GA range and thus only memory addresses (and not memory) are wasted.

The GA size is growing as chipset designs advance. For instance, GAs are reaching sizes as large as 32 GB. In future systems the chances are consequently greater that the GA range will overlap a memory range where RAM is present. Because the BIOS or the operating system marks the GA range as reserved, the GA range cannot be used for other purposes. If RAM lies in the GA range, the overlapping RAM will be unavailable.

SUMMARY

The present invention comprises a software program for reusing the physical memory that overlaps the graphics aperture. The program determines whether the graphics address re-mapping table is accessible by a device. The graphics address re-mapping table is then filled to re-map the graphics aperture according to whether the graphics address re-mapping table is accessible by the device.

DETAILED DESCRIPTION OF THE PREFERRED EMBODIMENTS

Figure 1:
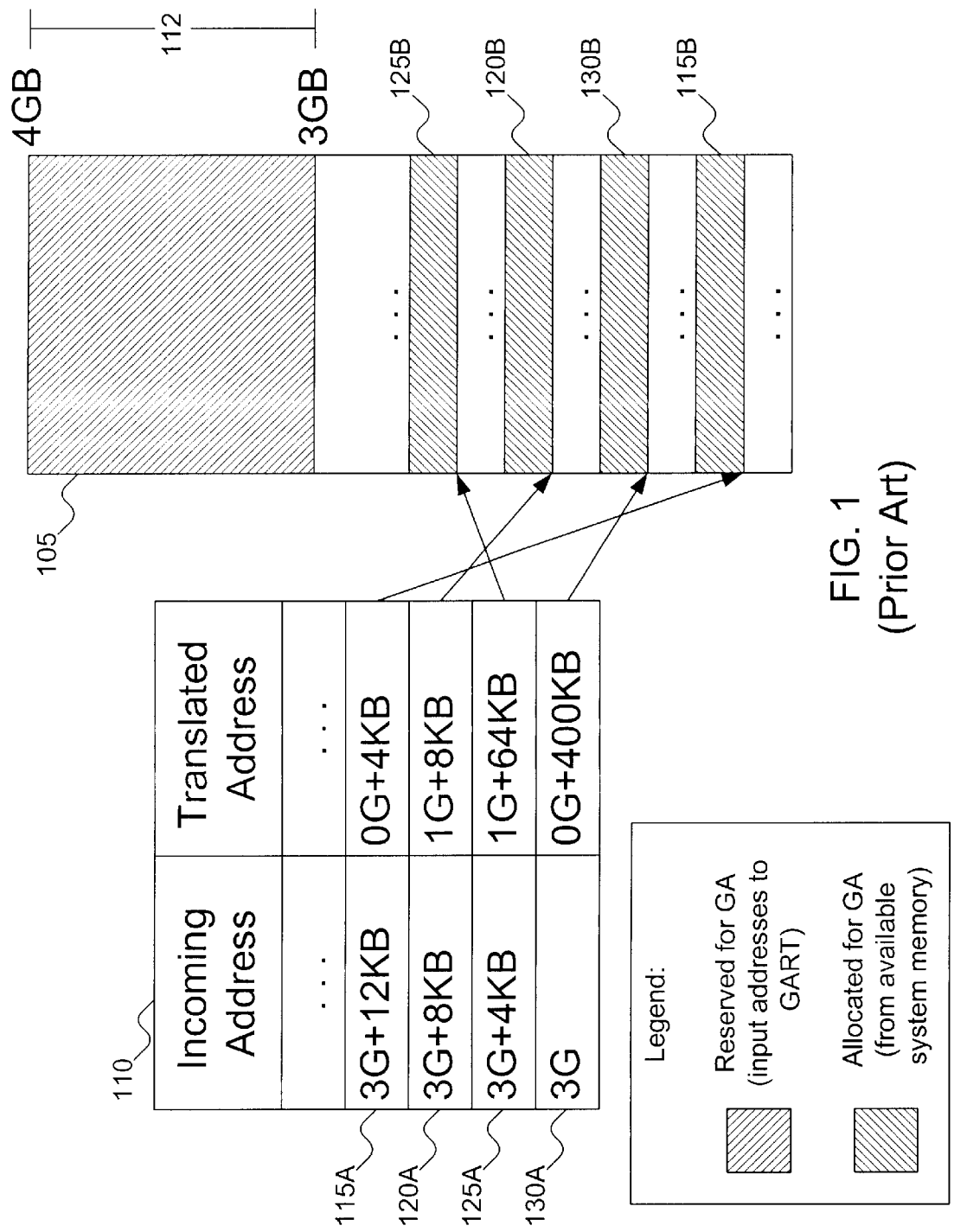
FIG. 1 shows a memory map according to the prior art.
Figure 2:
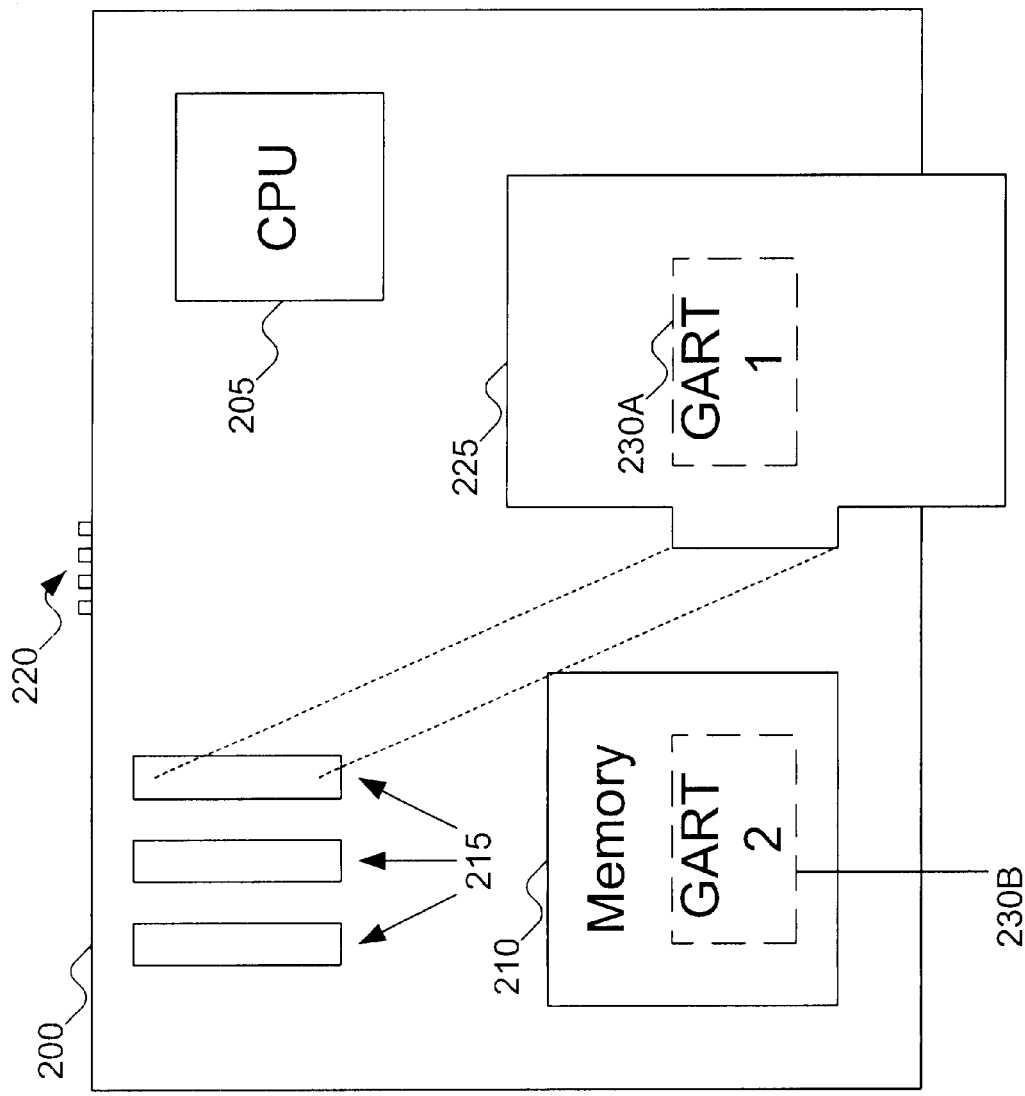
FIG. 2 shows a computer motherboard with an AGP graphics card installed in an embodiment of the invention.
Figure 3:
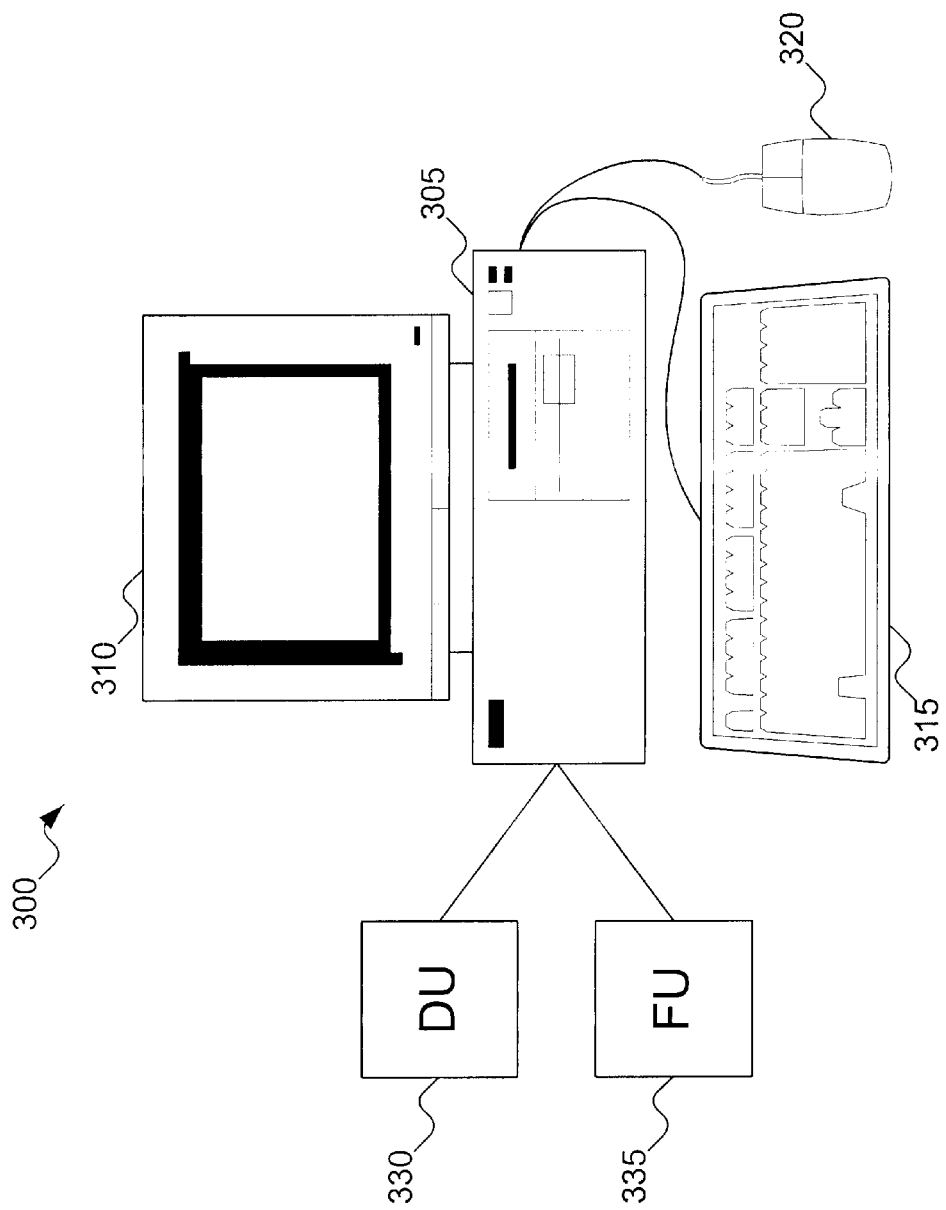
FIG. 3 shows a computer system in accordance with an embodiment of the invention.

FIG. 2 shows a computer motherboard 200. The motherboard includes a Central Processing Unit (CPU) 205, some installed memory 210, three slots 215 for installing adapter cards, and four ports 220. The ports 220 can serve a variety of functions: for example, with reference to FIG. 3, if motherboard 200 is installed in computer 305, the ports can be used to attach a monitor 310, a keyboard 315, a mouse 320, or other devices. Although only three slots 215 and four ports 220 are shown, the only limits to the number of slots 215 and ports 220 are physical space and connections to the motherboard 200. Also shown is Accelerated Graphics Port (AGP) graphics card 225. In FIG. 2, AGP graphics card 225 is installed in the third slot 215 from the left. It is not, however, important into which slot 215 AGP graphics card 225 is installed. A person skilled in the art will also recognize that the AGP graphics card 225 can be built into the motherboard 200, rather than being an installed daughterboard.

Depending on the chipset used, the Graphics Address Re-Mapping Table (GART) may be accessible only to the AGP graphics card 225; other devices (e.g., processors) cannot access the GART. Devices as used herein include all hardware and software that can read and write to memory. Devices specifically include other device drivers loaded on the computer. For example, the GART could be stored on the AGP graphics card 225, as shown at 230A. But a person skilled in the art will recognize that the GART could be stored in other locations and still be accessible only to the AGP graphics card 225. When the GART is inaccessible to other devices, the model is termed asymmetric. Alternatively, the GART can be accessible by both the AGP graphics card 225 and other devices. For example, the GART could be located in the system memory, as shown at 230B. A person skilled in the art will also recognize that the GART could be stored in other locations and still be accessible by both the AGP graphics card 225 and other devices. When the GART is accessible by both the AGP graphics card 225 and other devices, the AGP graphics card 225 and other devices can access the GART to get addresses translated through the GART. This model is termed symmetric.

Figure 4:
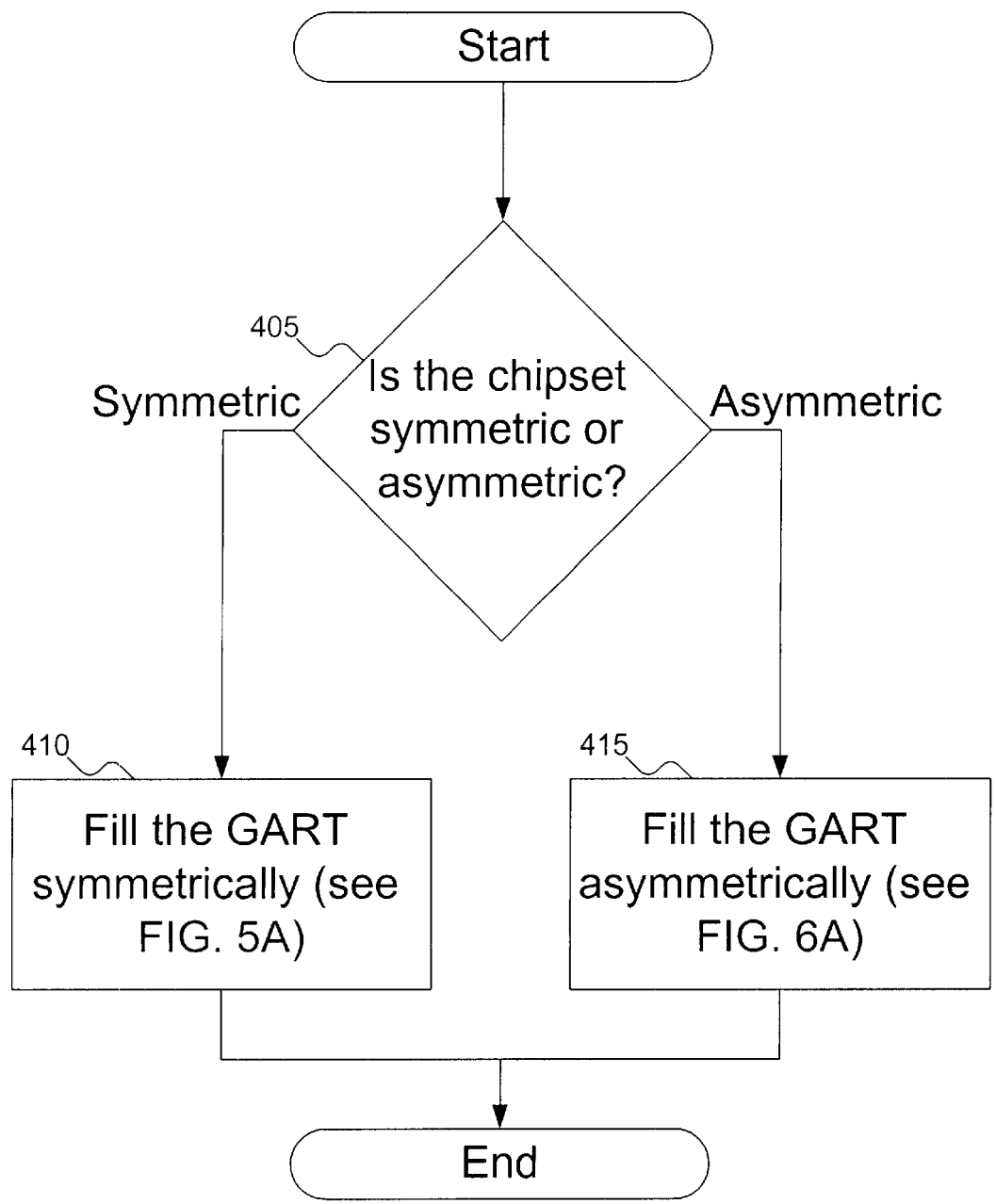
FIG. 4 shows a flowchart of a computer program illustrating how a computer system fills the GART depending on whether a chipset is symmetric or asymmetric.

Turning again to FIG. 3, computer system 300 includes a determination unit 330 and a filling unit 335. In the preferred embodiment, determination unit 330 and filling unit 335 are implemented in software. Determination unit 330 is responsible for determining if the model is symmetric or asymmetric, i.e., whether the GART is accessible to other devices or not. Filling unit 335 is then responsible for filling the GART based on the identified model. With reference to FIG. 4, determination unit 330 comprises step 405, and filling unit 335 comprises steps 410 and 415.

FIG. 4 illustrates a computer-implemented process that fills the GART according to whether the chipset is symmetric or asymmetric. In general, the process is implemented in software and loaded into the computer system from mass storage. At step 405, the process determines whether the chipset is symmetric or asymmetric. If the chipset is symmetric, then at step 410 the process fills the GART symmetrically. On the other hand, if the chipset is asymmetric, then at step 415 the process fills the GART asymmetrically.

Figure 5A:
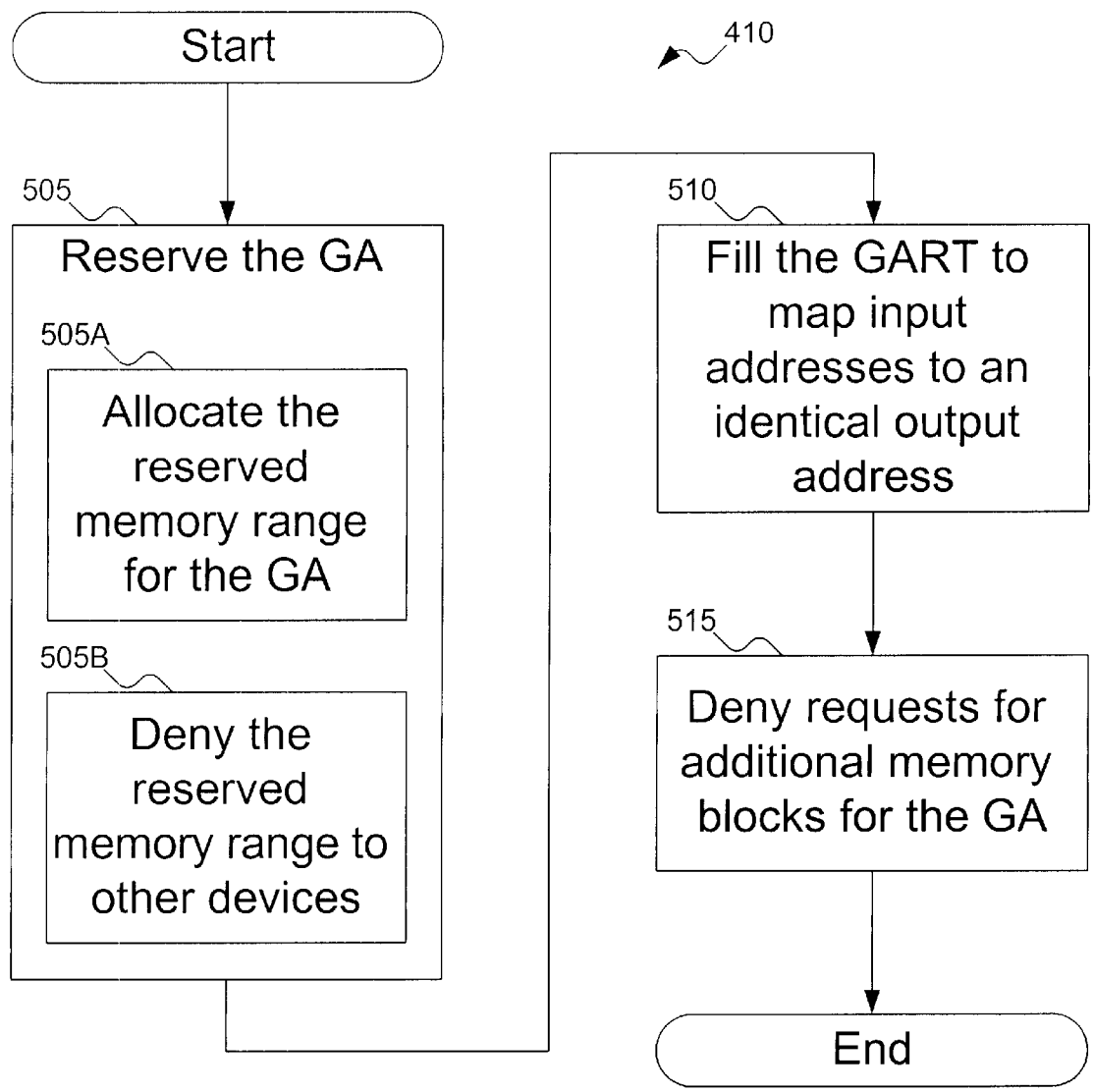
FIG. 5A shows a flowchart of how the GART is filled when the chipset is symmetric in accordance with a first embodiment of the invention.

FIG. 5A shows a flowchart of how the GART is filled when the chipset is symmetric in accordance with a first embodiment of the invention. First, at step 505, a portion of the system memory is reserved for the GA. This memory reserved for the GA is allocated from the system (step 505A). Once allocated for the GA, all other devices are denied access to the reserved memory (step 505B). Then, at step 510, the GART is constructed so that each input address from the reserved memory range maps to an identical address in the GA. Finally, at step 515, since the GA now has sufficient memory reserved for it, no additional memory should be allocated to the GA. Generally, the GA will not request additional memory from the system.

Figure 5B:
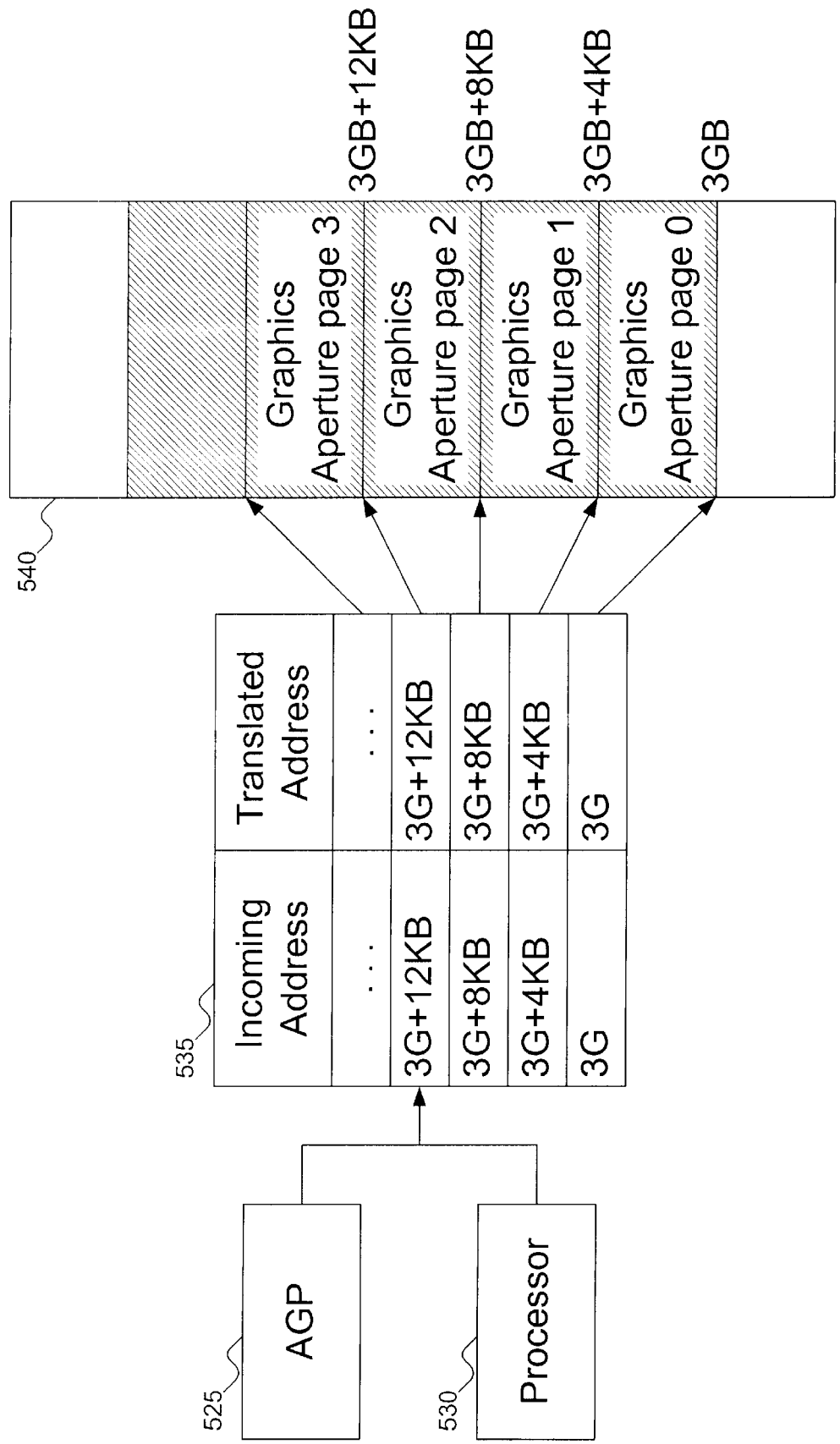
FIG. 5B shows a memory map and GART in accordance with the first embodiment of the invention when the chipset is symmetric.

FIG. 5B shows a memory map 540 and GART 535 construction in a symmetric chipset. As previously mentioned, in a symmetric chipset, both the AGP graphics card 525 and other devices can access GART 535. As also mentioned, in a symmetric chipset, GART 535 can be stored in main memory 540. FIG. 5B includes a processor 530 in addition to AGP graphics card 525. A person skilled in the art will recognize that other devices can be substituted for processor 530. Because GART 535 maps an input address in the reserved memory range to an identical output address, the incoming addresses and translated addresses in GART 535 are identical. The GA is shown as the shaded region of memory map 540.

Figure 6A:
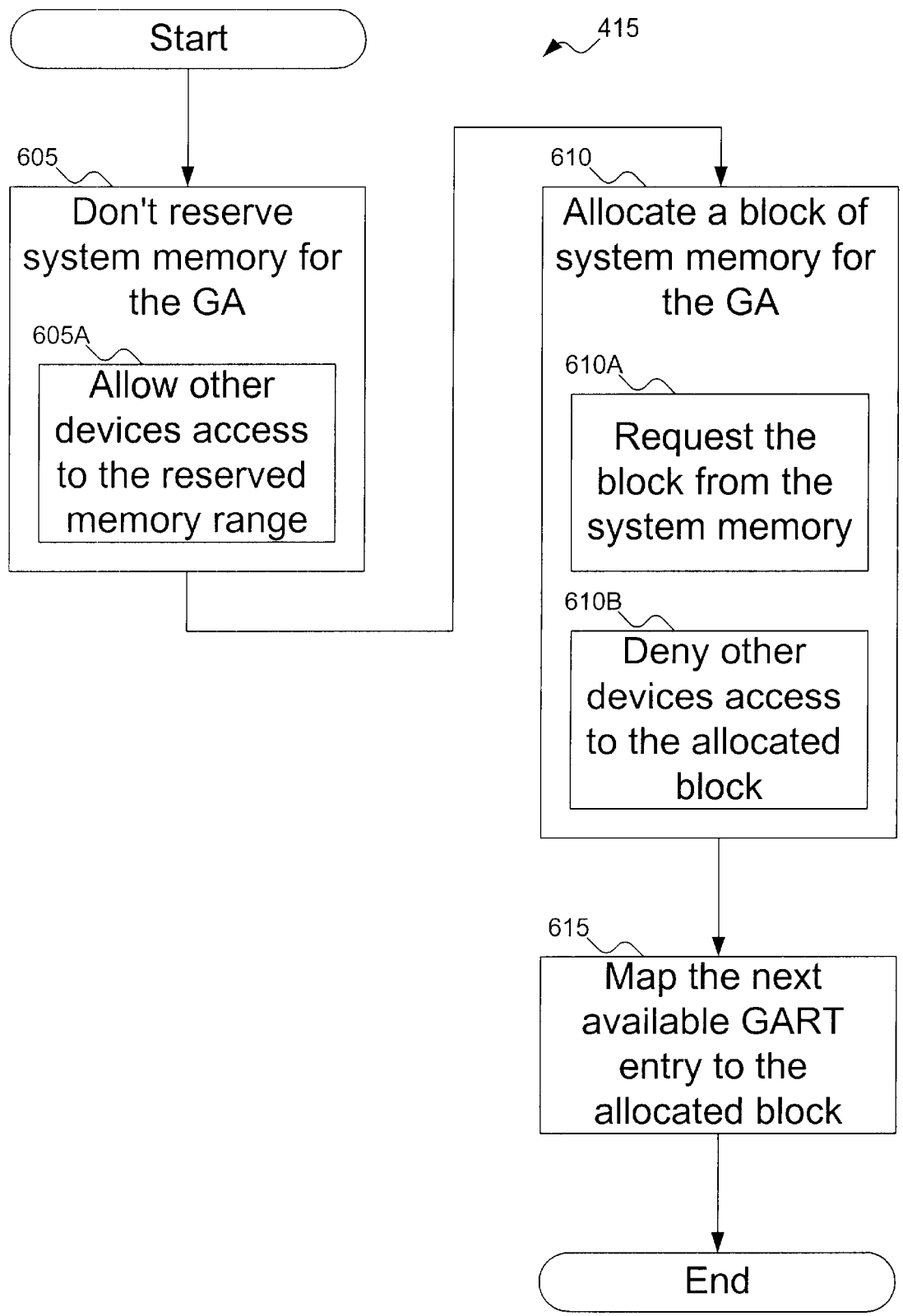
FIG. 6A shows a flowchart of how the GART is filled when the chipset is asymmetric in accordance with a second embodiment of the invention.

FIG. 6A shows a flowchart of how the GART is filled when the chipset is asymmetric in accordance with a second embodiment of the invention. First, at step 605, no memory is reserved for the GA. This means that other devices can access the reserved memory range (step 605A). Then, as the AGP graphics card needs more system memory for the GA, at step 610 a memory block is allocated for the GA. This includes a request to the system for a block of memory (step 610A). Further, once a block of system memory is allocated for the GA, other devices are denied access to that block of system memory (step 610B). Finally, at step 615, the next available entry in the GART is mapped to the newly-allocated block of system memory.

Figure 6B:
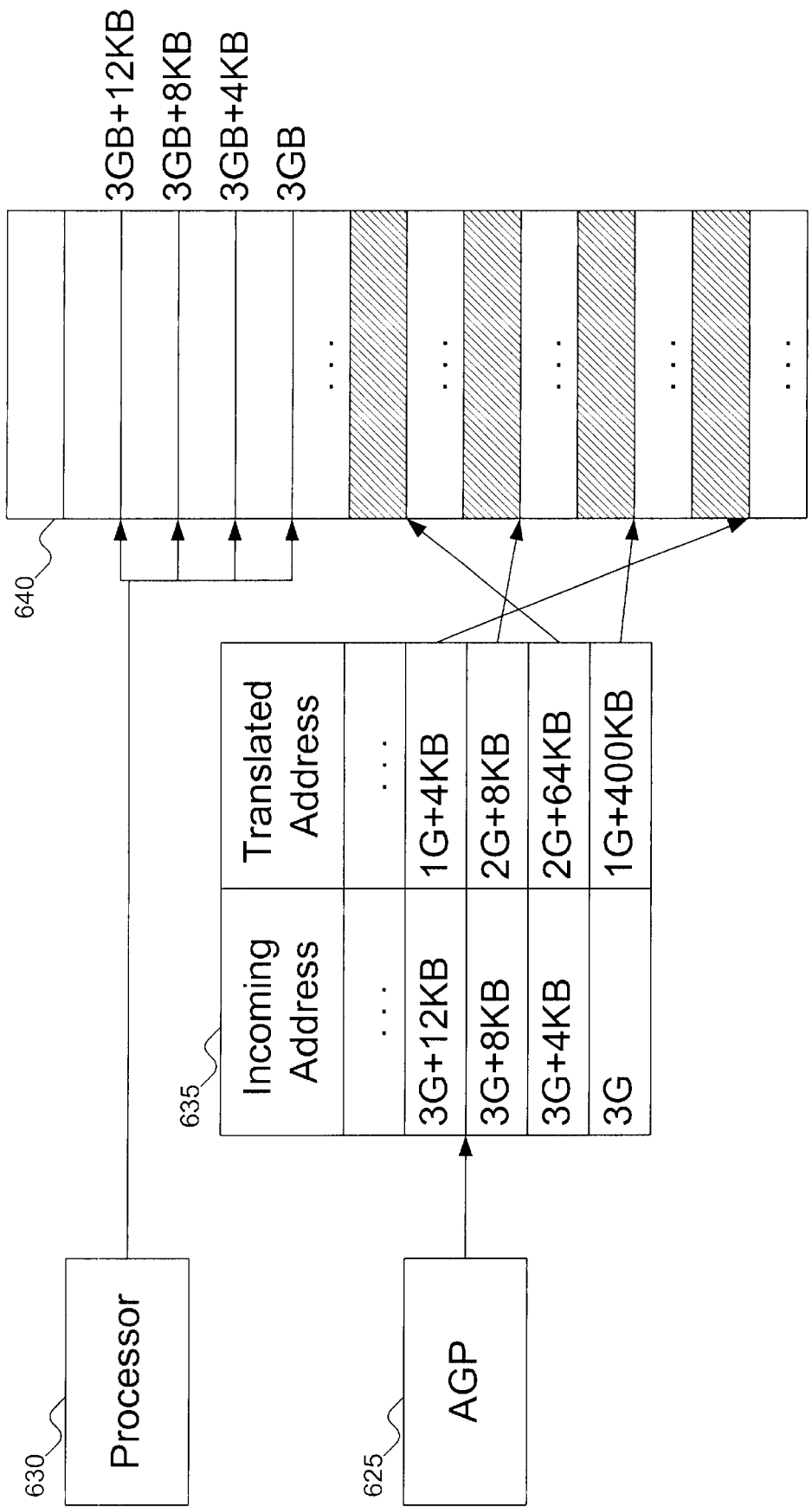
FIG. 6B shows a memory map and GART in accordance with the second embodiment of the invention when the chipset is asymmetric.

FIG. 6B shows a memory map 640 and GART 635 construction in an asymmetric chipset. As mentioned, in an asymmetric chipset, only the AGP graphics card 625 can access GART 635; other devices cannot access the GART. As also mentioned, in an asymmetric chipset, GART 635 can be stored in on the AGP graphics card 625. FIG. 6B includes a processor 630 in addition to AGP graphics card 625. A person skilled in the art will recognize that other devices can be substituted for processor 630. As memory blocks are allocated for the GA (shown as the shaded regions of memory map 540), consecutive input addresses in GART 635 map to various blocks of system memory 640. Note specifically that the processor 630 can access all of the system memory, including addresses within the reserved memory range.

The reason that the GART is treated differently in symmetric and asymmetric chipset systems will become clearer with the following explanation. Where the chipset is symmetric, other devices can also access the GART. If the GART does not use the memory reserved for the GA, memory addresses that represent available memory under the GA are re-mapped to other addresses in memory and lost. By using the reserved memory strictly for the GA, no additional memory will be allocated from the system memory for use by the GA. In comparison, where the chipset is asymmetric, the GART is only accessible by the AGP graphics card. Addresses in the reserved memory range sent by other devices are not re-mapped under the GART, and represent requests for the specified address. There are, thus, in fact two different types of address requests in the reserved memory range for an asymmetric chipset: those coming from the AGP graphics card (which are re-mapped by the GART) and those coming from other devices (which directly access the specified memory address).

Having illustrated and described the principles of our invention in the preferred embodiments thereof, it should be readily apparent to those skilled in the art that the invention can be modified in arrangement and detail without departing from such principles. We claim all modifications coming within the spirit and scope of the accompanying claims:

We claim:

1. A method for reusing a physical memory of a computer overlapping a reserved memory range for a graphics device driver, wherein the physical memory includes a plurality of addresses and a plurality of memory blocks at the plurality of addresses, and the reserved memory range includes a subset of the addresses for the memory blocks, the method comprising:

determining if a re-mapping table for the graphics device driver is accessible by a device; and filling the re-mapping table according to whether the re-mapping table is accessible by the device.

2. A method according to claim 1 wherein:

the re-mapping table is accessible by the device; and filling the re-mapping table includes:

reserving the reserved memory range for use by the graphics device driver; and mapping an input address for the reserved memory range to an identical output address with the re-mapping table.

3. A method according to claim 2 wherein reserving the reserved memory range for use by the graphics device driver includes denying the reserved memory range to the device.

4. A method according to claim 2 wherein reserving the reserved memory range for use by the graphics device driver includes allocating the memory blocks at the reserved memory range for the graphics device driver.

5. A method according to claim 2 wherein mapping an input address for the reserved memory range includes using the physical memory at the reserved memory range for the graphics device driver.

6. A method according to claim 2 wherein mapping an input address for the reserved memory range includes denying other memory blocks of the physical memory to the graphics device driver.

7. A method according to claim 1 wherein:

the re-mapping table is not accessible by the device; and filling the re-mapping table includes:

allocating a memory block at an address of the physical memory; and mapping an input address of the reserved memory range to the address for the memory block of physical memory.

8. A method according to claim 7 wherein filling the re-mapping table further includes allowing the device to access the reserved memory range.

9. A method according to claim 7 wherein allocating a memory block includes requesting the memory block for the graphics device driver.

10. A method according to claim 7 wherein allocating a memory block includes denying the device access to the memory block.

11. A method according to claim 1 wherein determining if the re-mapping table is accessible by a device includes determining whether the re-mapping table resides in the physical memory.

12. A method according to claim 1 wherein determining if the re-mapping table is accessible by a device includes determining whether the re-mapping table resides in a chipset.

13. A computer-readable medium containing a program for reusing a physical memory of a computer overlapping a reserved memory range for a graphics device driver, wherein the physical memory includes a plurality of addresses and a plurality of memory blocks at the plurality of addresses, and the reserved memory range includes a subset of the addresses for the memory blocks, the program comprising:

software determining if a re-mapping table for the graphics device driver is accessible by a device; and software filling the re-mapping table according to whether the re-mapping table is accessible by the device.

14. A computer-readable medium containing a program according to claim 13 wherein:

the re-mapping table is accessible by the device; and the software filling the re-mapping table includes:
software reserving the reserved memory range for use by the graphics device driver; and
software mapping an input address for the reserved memory range to an identical output address with the re-mapping table.

15. A computer-readable medium containing a program according to claim 14 wherein the software reserving the reserved memory range for use by the graphics device driver includes software denying the reserved memory range to the device.

16. A computer-readable medium containing a program according to claim 14 wherein the software mapping an input address for the reserved memory range includes software using the physical memory at the reserved memory range for the graphics device driver.

17. A computer-readable medium containing a program according to claim 13 wherein:

the re-mapping table is not accessible by the device; and the software filling the re-mapping table includes:
software allocating a memory block at an address of the physical memory; and
software mapping an input address of the reserved memory range to the address for the memory block of physical memory.

18. A computer-readable medium containing a program according to claim 17 wherein the software filling the re-mapping table further includes software allowing the device to access the reserved memory range.

19. A system for reusing a physical memory of a computer overlapping a reserved memory range for a graphics device driver, wherein the physical memory includes a plurality of addresses and a plurality of memory blocks at the plurality of addresses, and the reserved memory range includes a subset of the addresses for the memory blocks, the system comprising:

a determination unit to determine if a re-mapping table for the graphics device driver is accessible by a device; and a filling unit to fill the re-mapping table according to whether the re-mapping table is accessible by the device.

20. A system according to claim 19 wherein:

the re-mapping table is accessible by the device; and the filling unit to fill the re-mapping table includes:
a reservation unit to reserve the reserved memory range for use by the graphics device driver; and
a mapping unit to map an input address for the reserved memory range to an identical output address with the re-mapping table.

21. A system according to claim 20 wherein the reservation unit to reserve the reserved memory range for use by the graphics device driver includes a denial unit to deny the reserved memory range to the device.

22. A system according to claim 20 wherein the mapping unit to map an input address for the reserved memory range includes a use unit to use the physical memory at the reserved memory range for the graphics device driver.

23. A system according to claim 19 wherein:

the re-mapping table is not accessible by the device; and the filling unit to fill the re-mapping table includes:
an allocation unit to allocate a memory block at an address of the physical memory; and
a mapping unit to map an input address of the reserved memory range to the address for the memory block of physical memory.

24. A system according to claim 23 wherein the filling unit to fill the re-mapping table further includes an allowance unit to allow the device to access the reserved memory range.

25. A method for reusing a physical memory of a computer overlapping a reserved memory range in a graphics device driver, wherein the graphics device driver includes a re-mapping table accessible by a device, the method comprising:

reserving the reserved memory range of the physical memory for use by the graphics device driver;

denying the device access to the reserved memory range; and building the re-mapping table to map input memory addresses for the reserved memory range to an identical output address.

26. A method for reusing a physical memory of a computer overlapping a reserved memory range in a graphics device driver, wherein the first device driver includes a re-mapping table hidden from a device, the method comprising:

allowing the device access to the reserved memory range;

allocating a block of memory from the physical memory for use by the graphics device driver; and updating the re-mapping table to map an address in the reserved memory range to the block of memory.

* * * * *